United States Patent [19]

Nikolayczik

[11] Patent Number: 5,794,650

[45] Date of Patent: Aug. 18, 1998

[54] CARTRIDGE FOR SANITARY FITTINGS

[75] Inventor: Hans Nikolayczik, Minheim, Germany

[73] Assignee: American Standard Inc., Piscataway, N.J.

[21] Appl. No.: 821,150

[22] Filed: Mar. 20, 1997

[51] Int. Cl.$^6$ .................................................. F16K 25/00
[52] U.S. Cl. .................................... 137/454.2; 137/625.4; 137/625.17; 137/454.6
[58] Field of Search ........................ 137/625.4, 625.17, 137/454.2, 454.5, 454.6, 525.1

[56] References Cited

U.S. PATENT DOCUMENTS

| | | | |
|---|---|---|---|
| 4,765,368 | 8/1988 | Mutti et al. | 137/625.17 |
| 4,887,642 | 12/1989 | Bernat | 137/625.17 |
| 5,010,917 | 4/1991 | Iqbal | 137/454.6 |
| 5,014,736 | 5/1991 | Korfgen et al. | 137/454.5 |
| 5,372,161 | 12/1994 | Bechte | 137/625.17 |
| 5,375,624 | 12/1994 | Knapp | 137/625.4 |
| 5,417,242 | 5/1995 | Goncze | 137/625.4 |

*Primary Examiner*—Denise L. Ferensic
*Assistant Examiner*—Joanne Y. Kim
*Attorney, Agent, or Firm*—Elaine Brenner Robinson

[57] ABSTRACT

A cartridge for sanitary fittings including at least one stationary and one movable valve disk enclosed by a housing. The stationary valve disk is adjacent to a base of the housing and has at least one channel for water intake with a recess on the side of the stationary valve disk facing the base. This recess is coaxial with a passage in the base of the housing and accommodates a sealing ring which is also lodged in the passage. A rim is formed on the surface of the base which faces the stationary valve disk whereby the rim encircles the passage and extends into the recess of the stationary valve disk.

5 Claims, 2 Drawing Sheets ically with respect to the normal central plane of its longitudinal axis so that the sealing ring can be inserted in either direction into the passage through the base of the housing and the recess in the valve disk eliminating the possibility of error during assembly.

CARTRIDGE FOR SANITARY FITTINGS

The invention is directed to a cartridge for sanitary fittings having at least one stationary and one movable valve disk enclosed by a housing. The stationary valve disk adjacent to the base of the housing has at least one channel for water intake and a recess at the side of the stationary valve disk facing the housing base. The recess is coaxial with a passage through the base of the housing and accommodates a sealing ring which extends through the passage.

In existing sanitary fittings, the valve disks are welded into the housing of the cartridge in such a manner that a mounting gap parallel to the disks' contact surfaces is created. This results because the height of the interior of the housing is greater (by the width of the mounting gap) than the sum of the thicknesses of the valve disks. Typically, the mounting gap is up to 0.1 mm in width.

FIG. 1 shows in detail a prior art cartridge for a sanitary valve which is currently used in the industry. The base of the cartridge housing 44 has an opening which extends through the housing and forms a passage 47. A stationary valve disk 41 is located in the cartridge housing and includes a channel 45 and a recess 46 which are coaxial with passage 47. Lodged in passage 47 is a sealing ring 48 which projects into recess 46. When the cartridge is mounted in the body of a fitting, pressure is put on sealing ring 48 which presses stationary valve disk 41 onto a movable valve disk (which is not shown here) such that a mounting gap 53 is created between the opposing sides of stationary valve disk 41 and base 44 of the housing.

When the valve is closed, sealing ring 48 is under the pressure of the local water supply system and is subjected to the entire static pressure of the water. This deforms the elastic sealing ring and in practice the sealing ring is pressed into the mounting gap on the incoming water side, which considerably impairs the efficiency of the sanitary fitting. In order to counteract the "drawing-in" of the sealing ring into the mounting gap, it is customary to slip a steel ring 52 onto the outside of the sealing ring to support the sealing ring and bridge the mounting. Due to its usually slight dimensions, this component is very thin and can be bent or deformed easily. Also, these bearing rings are expensive to produce and must be slipped onto sealing ring 48 by hand, which increases the time needed to assemble and accordingly adds to the cost of the sanitary fitting.

SUMMARY OF THE INVENTION

It is therefore an object of the invention to provide a cost-effective means of preventing the sealing ring from collapsing and being drawn into the mounting gap.

This and other objects are achieved by the present invention which provides a cartridge for a sanitary fitting having at least one stationary and one movable valve disk enclosed by a housing. The stationary valve disk is adjacent to the base of the housing and has at least one channel for water intake and a recess at the side of the stationary valve disk facing the base. The recess is coaxial with a passage through the base of the housing and accommodates a sealing ring which is mounted along the inner surface of the passage. The base of the housing includes a rim which encircles the passage and extends into the recess of the stationary valve disk. The formation of the rim does not increase the cost of producing the housing. In effect, the rim reliably bridges the mounting gap so that the sealing ring cannot be drawn into the mounting gap under the high static water pressure when the valve is closed.

The diameter of the passage formed in the base in the area of the rim is preferably more narrow than the diameter in the other areas of the passage. As a result, the passage through the housing base can have the same diameter as the channel formed in the stationary valve disk and the sealing ring can be cylindrical in shape and have the same sectional area of flow as is customary.

In accordance with a preferred embodiment of the invention, the sealing ring has on its outer surface a circular recess in which the rim formed on the base of the housing lodges. With the exception of the area at which the circular recess is formed in the rim, the sealing ring has the usual thickness as is customary, but it is not prone to elastic deformation. The sealing ring preferably includes a central annular ridge in the circular recess which enhances the stability of the sealing ring. It is desirable to form the sealing ring symmetrically with respect to the normal central plane of its longitudinal axis so that the sealing ring can be inserted in either direction into the passage through the base of the housing and the recess in the valve disk eliminating the possibility of error during assembly.

BRIEF DESCRIPTION OF THE DRAWINGS

The invention will be more fully appreciated from the following detailed description when the same is considered in connection with the accompanying drawings in which.

DETAILED DESCRIPTION OF THE INVENTION

Figure 1:
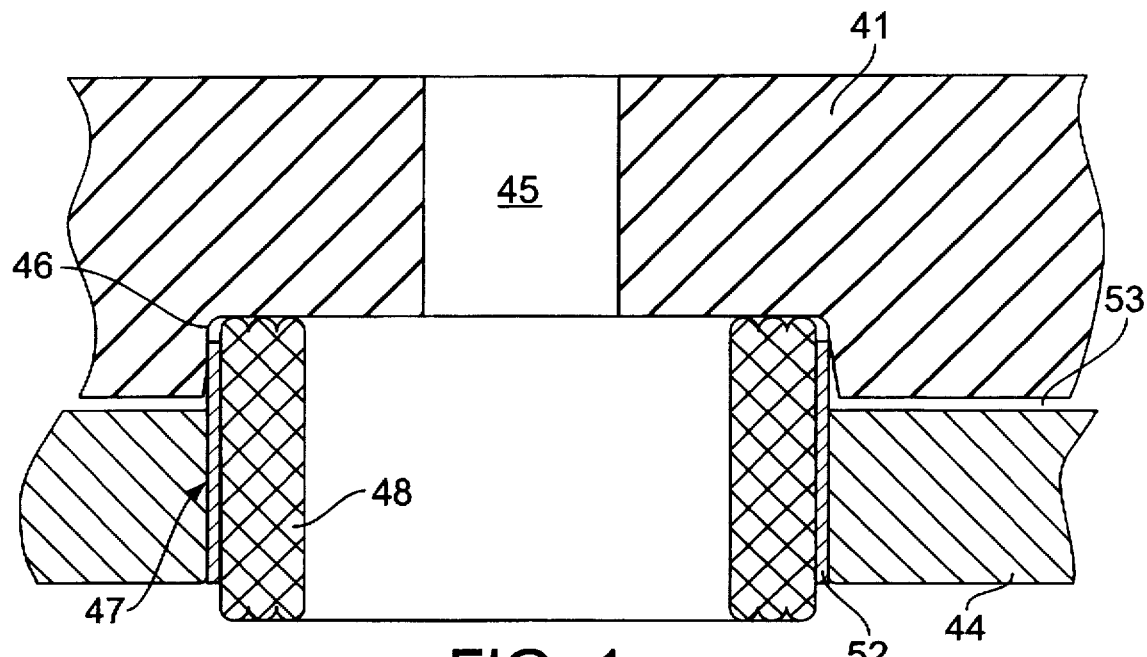
FIG. 1 is a partial sectional view of a prior art cartridge for a sanitary valve.
Figure 3:
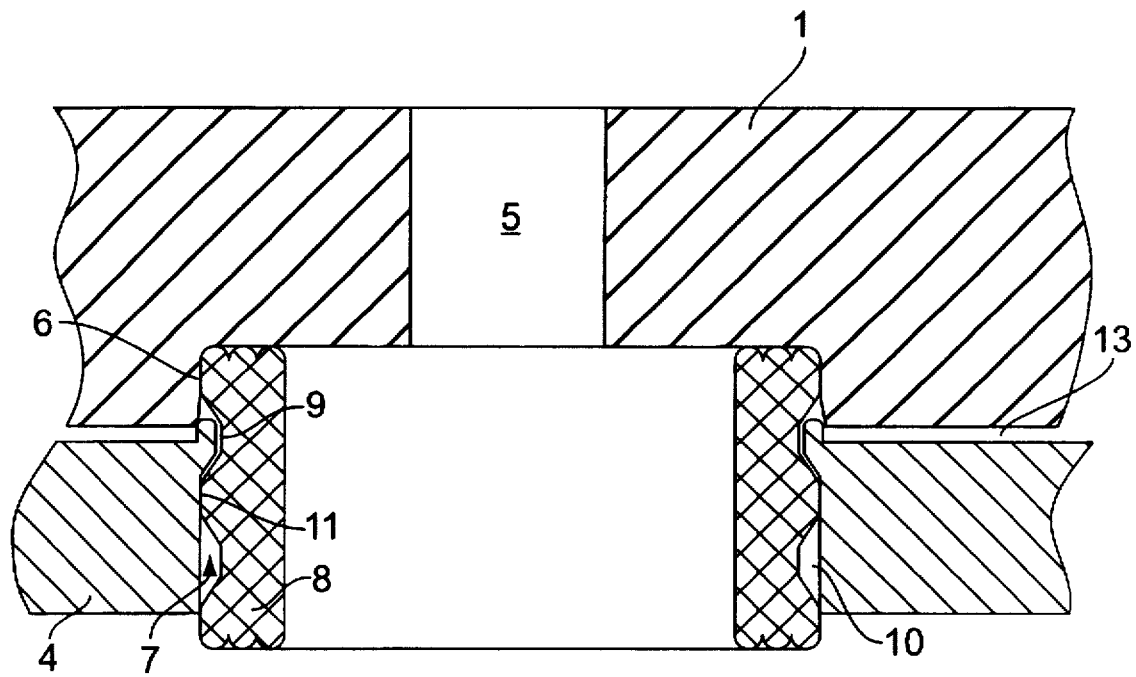
FIG. 3 is an enlarged view of a portion of the sanitary valve shown in FIG. 2.
Figure 2:
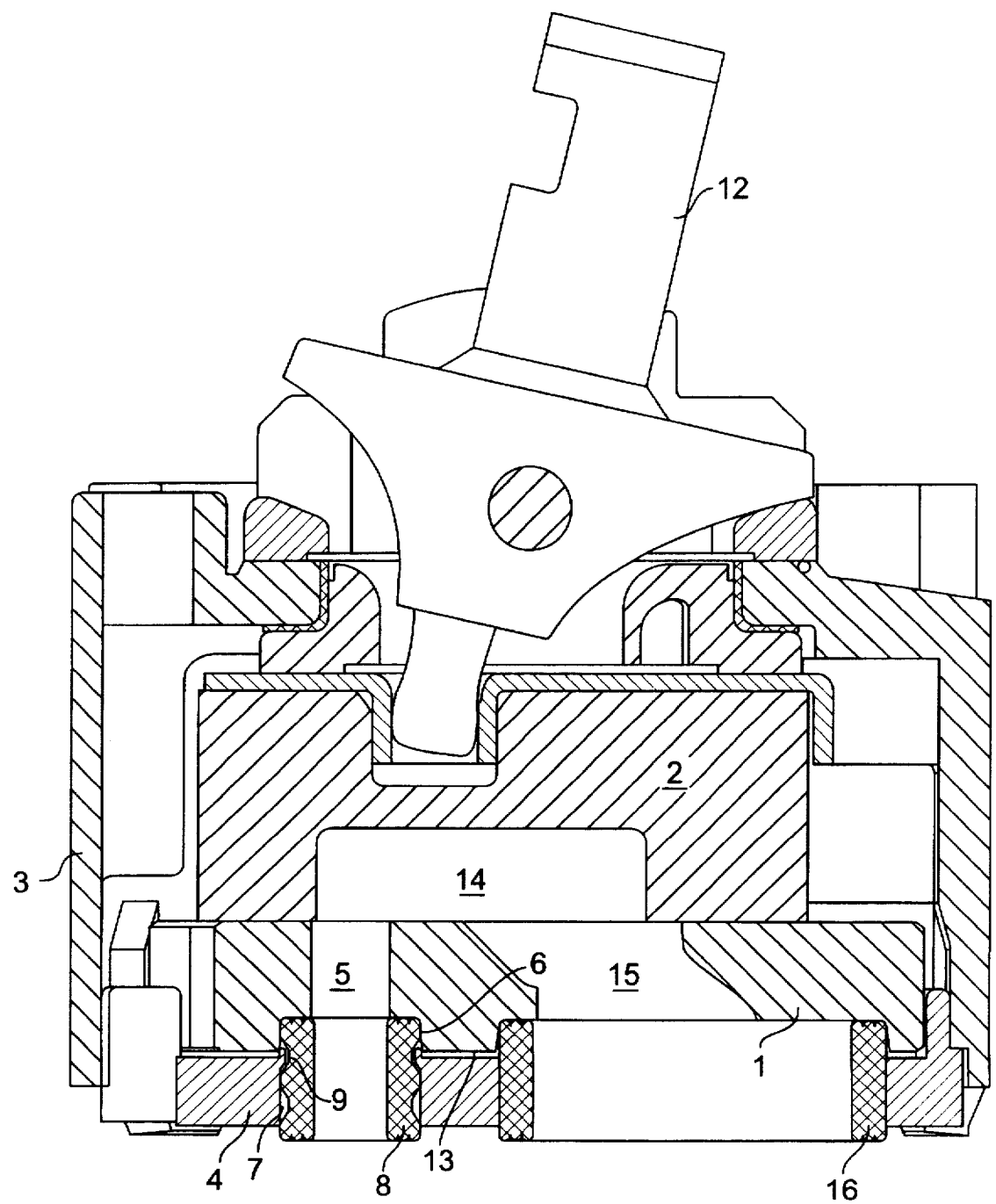
FIG. 2 is a partial sectional view of a sanitary valve in accordance with the claimed invention.

As already mentioned, FIG. 1 shows in detail a prior art cartridge which is currently used in the industry. Reference is now made to FIG. 2 which shows a cartridge 20 with a housing 3 which is connected to a base 4 of the housing. Inside housing 3 there are a stationary valve disk 1 and a valve disk 2 which can be moved by operating a lever 12. The valve is open in this drawing, i.e., the water flows through a sealing ring 8, a channel 5, a diversion chamber 14, which sometimes serves as a mixing chamber also, through an outlet passage 15 and a corresponding seal 16 to a spout, which is not shown here. Sealing ring 8 is seated in a passage 7 through base 4 and in a recess 6 of channel 5 through stationary valve disk 1. The pressure on seal 8 which occurs when the cartridge is inserted into the housing of a sanitary fitting causes stationary valve disk 1 to be pressed against movable valve disk 2 and a mounting gap 13 is formed in the housing between the opposing surfaces of stationary valve disk 1 and base 4 of the housing, as can be seen more clearly in FIG. 3. A rim 9 is formed at passage 7 of base 4 of the housing. Rim 9 extends both in a radial and in an axial direction of passage opening 7 and as a result bridges mounting gap 13 so that sealing ring 8 cannot be pressed into mounting gap 13 regardless of how much pressure exists. The outer side of sealing ring 8 has, in a symmetrical arrangement to the normal central plane of its longitudinal axis, a circular recess 10 which is divided into two sections by a central ridge 11. Rim 9 lodges in the upper annular grove section. As can be seen, since recess 10 is divided into two sections, the seal can be inserted in either direction eliminating the chance of error during assembly. The outer side of the seal lodges evenly both in enlargement 6 and, with its ridge 11 and lower section, in passage 7 without sealing ring 8 being deformed by rim 9. With the exception of the area possessing annular grooves 10, sealing ring 8 has the same thickness as is customary in the industry and the inner diameter of sealing ring 8 is not less that of the inner diameter of sealing rings used currently in the industry. The present invention reduces manufacturing costs involved in the manufacture of sanitary valves and increases the reliability of the valves.

Although illustrative embodiments of the present invention have been described herein with reference to the accompanying drawings, it is to be understood that the invention is not limited to those precise embodiments, and that various other changes and modifications may be effected herein by one skilled in the art without departing from the scope or spirit of the invention.

What is claimed is:

1. A cartridge for sanitary fittings comprising a housing with at least one stationary valve disk and one movable valve disk, said housing having a base, said stationary valve disk adjacent to said base whereby said stationary valve disk includes at least one channel for water intake and a recess positioned on a side of said stationary disk which faces said base, said base including a passage for water to flow through, a sealing ring disposed in said passage, said base including a rim on the top surface thereof which encircles said passage and projects into said recess of said stationary valve disk.

2. The cartridge according to claim 1 wherein said passage has a first diameter at said rim and a second diameter in an area not at said rim, said first diameter smaller than said second diameter.

3. The cartridge according to claim 2 wherein said sealing ring includes a circular recess on an outer surface thereof wherein said rim rests.

4. The cartridge according to claim 3 wherein said sealing ring includes a central annular ridge in said circular recess.

5. The cartridge of claim 4 wherein said sealing ring is formed symmetrically in relation to a normal central plane of a longitudinal axis.

* * * * *